(12) United States Patent
Spielman

(10) Patent No.: US 7,661,136 B1
(45) Date of Patent: Feb. 9, 2010

(54) DETECTING ANOMALOUS WEB PROXY ACTIVITY

(75) Inventor: Chaim Spielman, Spring Valley, NY (US)

(73) Assignee: AT&T Intellectual Property II, L.P., Reno, NV (US)

( * ) Notice: Subject to any disclaimer, the term of this patent is extended or adjusted under 35 U.S.C. 154(b) by 788 days.

(21) Appl. No.: 11/301,541

(22) Filed: Dec. 13, 2005

(51) Int. Cl.
G06F 11/30 (2006.01)

(52) U.S. Cl. .......................................... 726/22; 726/12

(58) Field of Classification Search ............... 726/22–25
See application file for complete search history.

(56) References Cited

U.S. PATENT DOCUMENTS

| | | | |
|---|---|---|---|
| 6,311,278 B1 | 10/2001 | Raanan et al. | |
| 6,415,321 B1 | 7/2002 | Gleichauf et al. | |
| 6,584,569 B2 | 6/2003 | Reshef et al. | |
| 6,711,687 B1 * | 3/2004 | Sekiguchi | 726/23 |
| 7,073,074 B2 * | 7/2006 | Pandit et al. | 713/194 |
| 7,484,097 B2 * | 1/2009 | Steiger et al. | 713/176 |
| 2002/0026591 A1 | 2/2002 | Hartley et al. | |
| 2003/0154402 A1 * | 8/2003 | Pandit et al. | 713/201 |
| 2003/0220940 A1 * | 11/2003 | Futoransky et al. | 707/104.1 |
| 2004/0250169 A1 * | 12/2004 | Takemori et al. | 714/38 |
| 2006/0085667 A1 * | 4/2006 | Kubota et al. | 714/4 |
| 2007/0030850 A1 * | 2/2007 | Grosse | 370/392 |
| 2007/0250916 A1 * | 10/2007 | Shull et al. | 726/5 |

OTHER PUBLICATIONS

Pham, Charles. "From Events to Incidents." Nov. 29, 2001. SANS Institute. p. 1-8.*

* cited by examiner

*Primary Examiner*—Christian LaForgia

(57) ABSTRACT

A method, system and apparatus for detecting anomalous web proxy activity by end-users are disclosed. The techniques include analyzing records from a web proxy log and determining whether the records contain anomalous end-user activity by inspecting a uniform resource locator and a connect instruction included therein. The techniques also include generating an alert in response to the analysis.

20 Claims, 3 Drawing Sheets

PROXY LOG FILE — 22

| # | Field | Ref |
|---|---|---|
| 1 | Source IP Address | 40 |
| 2 | Source Name | 42 |
| 3 | Date | 44 |
| 4 | Time | 46 |
| 5 | Service name | 48 |
| 6 | Destination name | 50 |
| 7 | Destination IP Address | 52 |
| 8 | Destination port | 54 |
| 9 | Processing time | 56 |
| 10 | Bytes sent | 58 |
| 11 | Bytes received | 60 |
| 12 | Protocol name | 62 |
| 13 | Transport | 64 |
| 14 | Instruction | 66 |

FIG. 2

DETECTING ANOMALOUS WEB PROXY ACTIVITY

TECHNICAL FIELD

The present invention generally relates to web proxy activity, and more particularly to detecting anomalous web proxy activity.

BACKGROUND OF THE INVENTION

Generally, a proxy server is a computer network service that allows client applications, such as a Web browser, to make indirect network connections to other network services. Typically, a client computer connects to the proxy server and then requests a connection, file, or other resource available on a remote Internet server. The proxy provides the resource, possibly by connecting to the remote Internet server, or by serving it from a cache.

Over the years, enterprises have used proxy servers within their Intranets to provide end-users with access to the Internet. Use of proxy servers by end-users, however, has unwittingly increased the likelihood of a network attack on organizational Intranets. For example, end-user Internet activity may unknowingly access applications, such as malware—software designed to take over and/or damage a computer's operating system, spyware—software designed to intercept or take partial control of a computer's operation, and botnets—a collection of software robots that run autonomously on one or more computers, all of which utilize web proxy servers to bypass corporate network controls and cause Intranet disruption. In many instances, these applications are encrypted and not visible to security analysis tools.

As a result, there is a need for an efficient technique to detect end-user Internet activity that may compromise the network security of enterprises.

SUMMARY OF THE INVENTION

A method, system and apparatus for detecting anomalous web proxy activity by end-users are disclosed. The techniques include analyzing records from a web proxy log and determining whether the records contain anomalous end-user activity by inspecting a uniform resource locator and a connect instruction included therein. The techniques also include generating an alert in response to the analysis.

Various aspects of the system relate to extracting proxy log information and determining whether an alert is to be raised.

For example, according to one aspect, a method of detecting anomalous web proxy activity includes parsing a record from a web proxy log, determining whether the record comprises a numeric uniform resource locator and a connect instruction, and generating an alert in response to the determination. The method also may include parsing the record by comparing a time entry of the record to a configurable time period.

In some embodiments, the method also may include parsing the numeric uniform resource locator for a destination Internet protocol address. In yet other embodiments, the method may include calculating a sum of the distinct destination Internet protocol addresses for a source internet protocol address included in the record, comparing the sum of distinct destination Internet protocol addresses to a threshold number and generating the alert based on the comparison.

A system, as well as articles that include a machine-readable medium storing machine-readable instructions for implementing the various techniques, are disclosed.

Details of various embodiments are discussed in greater detail below.

In some embodiments, one or more of the following advantages may be present. For example, the disclosed techniques may detect the presence of malware, spyware, and botnets on an organization's Intranet prior to any damage occurring to the Intranet or Intranet resources.

An additional benefit of the system may relate to reducing false positives. For example, proxy servers tend to process thousands of requests per hour. The disclosed techniques may focus a system administrator on specific anomalous activity though focused alerts.

Additional features and advantages will be readily apparent from the following detailed description, the accompanying drawings and the claims.

BRIEF DESCRIPTION OF THE DRAWINGS

FIG. 2 illustrates exemplary web proxy log fields in a web proxy log.

Like reference symbols in the various drawings indicate like elements.

DETAILED DESCRIPTION OF THE PREFERRED EMBODIMENTS

Figure 1:
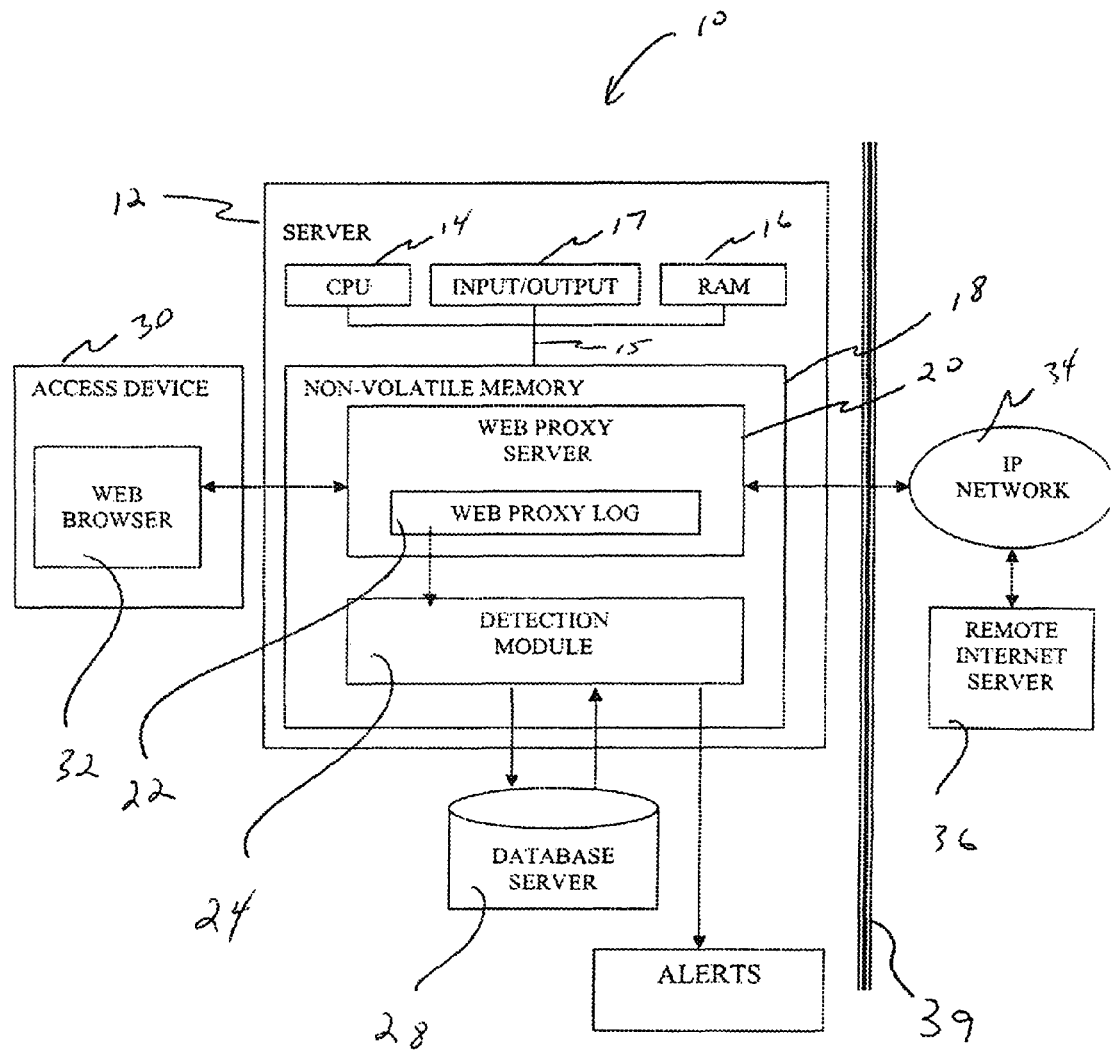
FIG. 1 illustrates a block diagram of an exemplary computer system for detecting anomalous web proxy activity.

FIG. 1 illustrates a block diagram of a networked computer system 10 for detecting anomalous web proxy activity. In one preferred embodiment, the system 10 is configured in an organization and provides end-user access to the Internet.

As shown in FIG. 1, the system 10 includes a server 12 that includes a central processing unit (CPU) 14, random access memory (RAM) 16, a non-volatile memory 18 and an input-output device 17, all of which are preferably interconnected via a common bus 15 and controlled by the CPU 14. As shown in FIG. 1, the server is attachable to an IP network 34 through a firewall 39.

The IP network 34 may be the publicly available IP network (the Internet), a private IP network, or a combination of public and private IP networks. The IP network 34 operates according to the Internet Protocol and routes data packets among its many switches and through its many transmission paths to remote Internet servers. IP networks are generally known in the art, are fairly easy to use and are heavily supported. As shown in the FIG. 1 example, a remote Internet Server 36 is coupled to the IP network 34 to which requests may be sent from the server 12, such requests including a destination IP address for the remote internet server 36 that may be based on a Uniform Resource Locator (URL).

The firewall 39 filters packets from the server 12 by deciding what packets may be sent externally according to rules defined by an administrator. In one preferred embodiment, filtering rules are provided that can act on the basis of source and destination IP addresses and on ports, in addition to higher-level network protocols the packets may contain.

In one preferred embodiment, the firewall 39 is stateful meaning that the firewall 39 stores information on the state of connections (e.g., established or not, initiation, handshaking, data or breaking down the connection) as part of their rules (e.g., only access devices inside the firewall 39 can establish connections on a certain port). In other embodiments, the firewall 39 is stateless meaning that the firewall does not store what stage communications may be between the browser 32 and the remove Internet server 36.

As shown in FIG. 1, the server 12 is attachable to an access device 30 that may include a personal computer, a laptop computer, or other electronic-based device. The access device 30 generally includes an input device (not shown), such as a mouse, keyboard, keypad, light-pen, touch-screen, track-ball, or speech recognition unit, audio/video player, and the like and an output device (not shown) suitable to give output to the user.

In one preferred embodiment, the access device 30 is configured to include a browser 32 that may send and receive information from the remote Internet server 36 using the server 12. For example, a user using the web browser 32 may request that a specific web page be downloaded to the access device 30. Although only one access device is illustrated in FIG. 1, the system 10 may be configured to support multiple access devices and be configured in a multitude of enterprise network topologies.

The system 10 also includes a database server 28. Examples of database servers with which the present invention may operate include Oracle, Sybase, Informix, SQL Server and DB2. In some preferred embodiments, the database server 32 is a directory server, such as a Lightweight Directory Access Protocol (LDAP) server, In other embodiments, the database server 28 is a configured area in the non-volatile memory 18 of server 12. It will be appreciated by one skilled in the art that the database server 28 may be used to not only access information but may also be used to store information.

The non-volatile memory of the server 12 is configured to include a web proxy server 20, a web proxy log 22, and a detection module 24

The web proxy server 20 is a specialized web server that may provide a connection, file, or other resource available on the Internet to an end-user behind the firewall 39. In one preferred embodiment, the proxy server 20 allows or denies end-user Internet requests according to the protocol of the requests. For example, the proxy server 20 may allow end-user requests to FTP servers on the Internet while denying end-user requests to HTTP servers.

In one preferred embodiment, the web proxy server 20 is configured to listen for a request from the web browser 32 of the access device 30 and to determine whether the request can be met by serving it from a cache of the proxy server 20 or by a connection to the remote Internet server 36 through the firewall 39. Upon determining how the request can be met, the proxy server 20 sends the requested information to the web browser 32 using one or more communication protocols, such as HTTP (Hyper Text Markup Language), and logs the transaction as a record in the web proxy log 22.

Referring now to FIG. 2, the web proxy log 22 contains connection-specific transaction information for proxy connections between the remote Internet server 36 and the access device 30. As shown in FIG. 2, each transaction record included in the log 22 may include a source IP address 40 representing the Internet Protocol address of the requesting access device 30, a source name 42 representing a computer account on the Intranet initiating the request, a date 44 and time 46 entry representing the date and time the transaction was recorded, a service name 48 indicating whether the transaction is an outgoing Web request to the remote Internet server 36 or an incoming web request from the remote Internet server 36, a destination name 50 representing the user resource locator (URL) name for the remote Internet server 36 that provided service for the transaction, a destination IP address 52 indicating the network IP address for the remote Internet server that provided service for the transaction, and a destination port indicating a reserved port number on the remote Internet server 36 that provided service for the transaction.

The proxy log 22 also may include a processing time entry 56 that indicates the total elapsed time in processing the transaction, the number of bytes sent 58 from the access device 30 to the remote Internet server 36 during the transaction, the number of bytes received 60 from the remote Internet server 36 to the access device 30 during the transaction, the protocol name 62 used for the transaction (e.g., HTTP, File Transfer Protocol (FTP), and Secure Hypertext Transfer Protocol (HTTPS)), the transport protocol 64 used for the transaction (e.g., Transmission Control Protocol (TCP) and User Datagram Protocol (UDP)) and an instruction 66 that indicated the application method used in the transaction (e.g., GET, PUT, POST, HEAD, and CONNECT).

Of course it will be appreciated by one skilled in the art that other information associated with the transaction may be stored by the proxy server 20 into the web proxy log 22 and that the present invention is not limited to the set of exemplary log entries shown in FIG. 2.

Referring back to FIG. 1, the detection module 24 detects suspicious web activity by analyzing transaction records included in the web proxy log 22. In one preferred embodiment, the detection module 24 detects suspicious activity by calculating the number of distinct destination hosts that a source Internet protocol address is connecting to and generates an alert when the calculated number exceeds a threshold value for the destination host. The detection module 24 may detect suspicious Voice Over IP (VOIP) applications, questionable peer-to-peer file sharing activity, as well as various types of malware and spyware. Once detected, the detection module 24 may transmit a generated alert to an administrator for further analysis.

Figure 3:
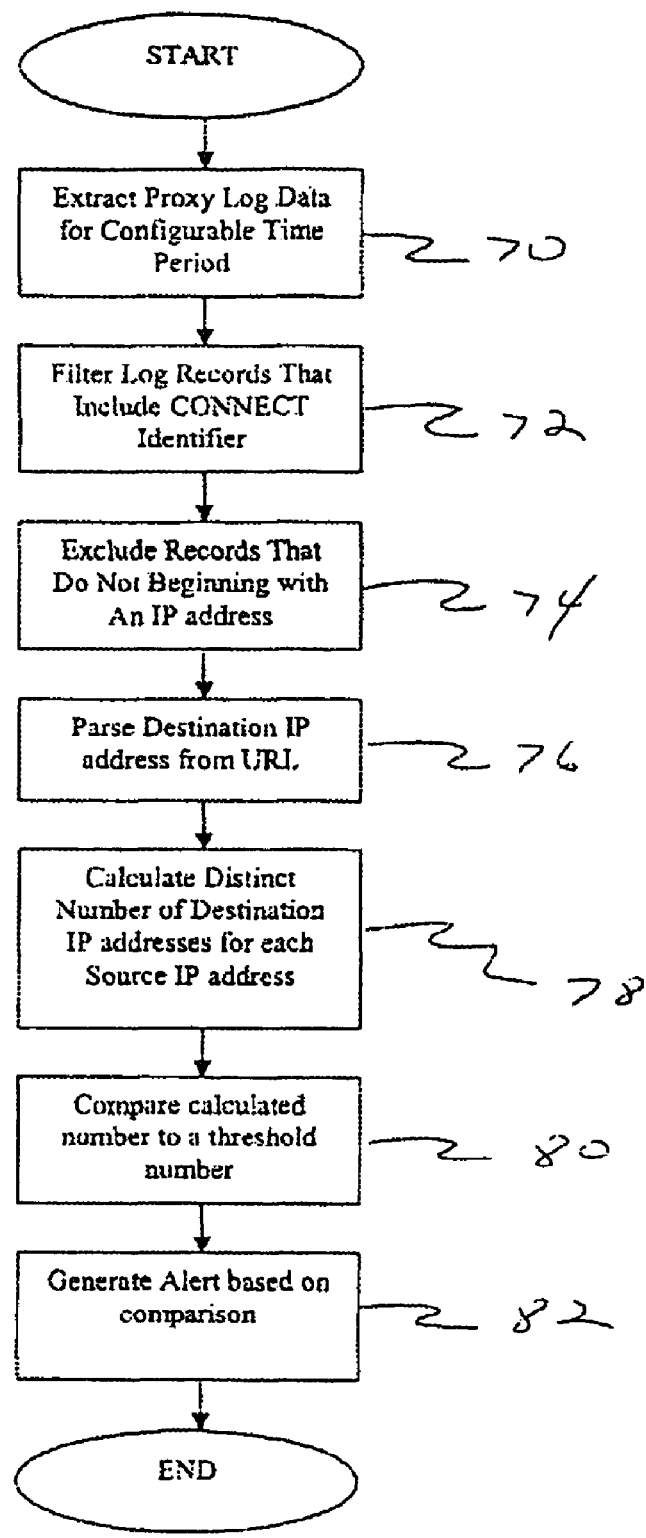
FIG. 3 is a flow chart of a method for detecting anomalous web proxy activity.

Referring now to FIG. 3, a flowchart of steps carried out by the detection module 24 is disclosed. As shown in FIG. 3, first, the detection module 24 extracts records from the proxy log 22 for a configurable time period 70. In one preferred embodiment, each transaction record includes a source Internet protocol (IP) address, a uniform resource locator (URL) and an instruction to the web server 20. The extracted records then may be stored in the database server 28. For example, the detection module 24 may be configured to extract transaction records that were entered into the log between the hours of 9:00 AM and 3:00 PM and save the same in the database server 28.

Next, the detection module 24 filters the extracted records to exclude records not having a 'CONNECT' instruction 72. For example, in one preferred embodiment, transaction records containing HTTP instructions such as GET, PUT, POST and HEAD are deleted from the extracted transaction records. Next, the detection module 24 filters the extracted records to exclude records not beginning with an Internet address in the URL field 74. For example, records containing 'www.att.com' in the URL field would be excluded. Next, the detection module 24 may parse a destination IP address from the URL field and drop any additional information contained in the field 76. For example, the detection module 24 may parse a destination IP address '152.16.2.1' from a URL field containing the value '135.16.2.1/index.htm'.

Next, the detection module 24, for each source IP address in the filtered records, calculates the distinct number of destination IP addresses that the source IP address is connecting to 78. The detection module 24 then may compare the calculated number of destination IP addresses to a threshold number established for the source IP address 80. The threshold number may be any whole number that represents an excessive number of connections to a remote Internet server. Lastly, the detection module 24 may generate an alert based on the comparison 82 and transmit the alert to an administrator for further analysis.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

A number of embodiments of the invention have been described. Nevertheless, it will be understood that various modifications may be made without departing from the spirit and scope of the invention. For example, the modules described above may be organized or contained in various ways, and may reside on multiple computers. Also, the steps described above may be modified in various ways or performed in a different order than described above, where appropriate. Accordingly, other embodiments are within the scope of the following claims.

What is claimed is:

1. A method of detecting anomalous web proxy activity comprising:
    extracting a plurality of records from a proxy log for a specified time period using a detection module implemented by a server;
    filtering the plurality of records extracted from the proxy log by the detection module to exclude records that do not include identified information, the identified information being at least an Internet Protocol (IP) address at a beginning of a uniform resource locator (URL) field and a connect instruction;
    determining, with the detection module, whether a first one of the records extracted from a web proxy log, and not excluded by the filtering, comprises suspicious web activity based on a number of distinct destination hosts to which a source connects; and
    generating an alert in response to the determination by the detection module.

2. The method of claim 1, further comprising parsing the record by comparing a time entry of the record to a configurable time period.

3. The method of claim 1, wherein the connect instruction is a Hyper Text Transfer Protocol connect method.

4. The method of claim 1 comprising parsing the uniform resource locator field for the destination Internet Protocol address.

5. The method of claim 4 comprising calculating a sum of the distinct Internet Protocol addresses for a source internet protocol address included in the record.

6. The method of claim 5 comprising comparing the sum of distinct Internet Protocol addresses to a threshold number.

7. The method of claim 6 comprising generating the alert based on the comparison.

8. An article comprising a machine-readable medium storing machine-readable instructions that, when applied to a machine, cause the machine to:
    extract a plurality of records from a proxy log for a specified time period;
    filter the plurality of records extracted from the proxy log to exclude records that do not include identified information, the identified information being at least an Internet Protocol (IP) address at a beginning of a uniform resource locator (URL) field and a connect instruction;
    determine whether a first one of the records extracted from a web proxy log, and not excluded by the filtering, comprises suspicious web activity based on a number of distinct destination hosts to which a source connects; and
    generate an alert in response to the determination.

9. The article of claim 8 including instructions that, when applied to the machine, cause the machine to compare a time entry of the record to a configurable time period.

10. The article of claim 8 including instructions that, when applied to the machine, cause the machine to parse the numeric uniform resource locator field for the Internet Protocol address.

11. The article of claim 10 including instructions that, when applied to the machine, cause the machine to calculate a sum of the distinct Internet Protocol addresses for a source internet protocol address included in the record.

12. The article of claim 11 including instructions that, when applied to the machine, cause the machine to compare the sum of distinct Internet Protocol addresses to a threshold number.

13. The article of claim 12 including instructions that, when applied to the machine, cause the machine to generate the alert based on the comparison.

14. The article of claim 13 including instructions that, when applied to the machine, cause the machine to transmit the alert to a system administrator.

15. A system comprising a service delivery device coupled to a network, the service delivery device including a processor and memory storing instructions that, in response to receiving a request for access to a service, cause the processor to:
    extract a plurality of records from a proxy log for a specified time period;
    filter the plurality of records extracted from the proxy log to exclude records that do not include identified information, the identified information being at least an Internet Protocol (IP) address at a beginning of a uniform resource locator (URL) field and a connect instruction;
    determine whether a first one of the records extracted from a web proxy log, and not excluded by the filtering, comprises suspicious web activity based on a number of distinct destination hosts to which a source connects; and
    generate an alert in response to the determination.

16. The system of claim 15, wherein the memory stores instructions that, in response to receiving the request over the network, cause the processor to compare a time entry of the record to a configurable time period.

17. The system of claim 15, wherein the memory stores instructions that, in response to receiving the request over the network, cause the processor to parse the numeric uniform resource locator for the Internet Protocol address.

18. The system of claim 17, wherein the memory stores instructions that, in response to receiving the request over the network, cause the processor to calculate a sum of the distinct Internet Protocol addresses for a source internet protocol address included in the record.

19. The system of claim 18, wherein the memory stores instructions that, in response to receiving the request over the network, cause the processor to compare the sum of distinct Internet Protocol addresses to a threshold number.

20. The system of claim 19, wherein the memory stores instructions that, in response to receiving the request over the network, cause the processor to generate the alert based on the comparison.

* * * * *